United States Patent
Lu

[11] Patent Number: 6,159,103
[45] Date of Patent: Dec. 12, 2000

[54] CONSTANT VELOCITY UNIVERSAL JOINT

[75] Inventor: Jun Jim Lu, Saginaw, Mich.

[73] Assignee: Delphi Technologies, Inc., Troy, Mich.

[21] Appl. No.: 09/233,863

[22] Filed: Dec. 17, 1998

[51] Int. Cl.$^7$ .................................................. F16D 3/223
[52] U.S. Cl. ........................................... 464/145; 464/906
[58] Field of Search .................................. 464/145, 139, 464/141, 143, 144, 906

[56] References Cited

U.S. PATENT DOCUMENTS

| | | | |
|---|---|---|---|
| 2,949,022 | 8/1960 | Leon . | |
| 3,071,944 | 1/1963 | Mazziotti et al. | 464/145 |
| 3,105,369 | 10/1963 | Mazziotti et al. | 464/145 |
| 3,133,431 | 5/1964 | Zech | 464/144 |
| 3,176,477 | 4/1965 | Mazziotti . | |
| 3,370,441 | 2/1968 | Aucktor . | |
| 3,475,924 | 11/1969 | Aucktor . | |
| 4,678,453 | 7/1987 | Aucktor . | |
| 5,026,325 | 6/1991 | Welschof . | |
| 5,509,856 | 4/1996 | Welschof . | |
| 5,643,091 | 7/1997 | Kozlowski | 464/144 |
| 5,647,800 | 7/1997 | Warnke . | |

*Primary Examiner*—Lynne H. Browne
*Assistant Examiner*—Kenneth Thompson
*Attorney, Agent, or Firm*—Edmund P. Anderson

[57] ABSTRACT

A disc style cross groove universal joint including an outer joint member open on front and back sides having a plurality of inward facing outer ball grooves and an inner joint member inside of the outer joint member having a plurality of outward facing inner ball grooves. The inner and outer ball grooves define crossed pairs having a bearing ball therebetween. In a center position of the inner joint member in the outer joint member, the bearing balls are evenly angularly spaced. A cage has a plurality of windows for the bearing balls. An outboard side edge of each cage window is separated from the center of the bearing ball therein by a long span dimension in the center position of the inner joint member. An inboard side edge of each cage window is separated from the center of the bearing ball therein by a short span dimension in the center position of the inner joint member. The short span dimension is calculated to stop the bearing balls and immobilize the inner joint member during an inward stroke of the latter before the bearing balls can escape through the back side of the outer joint member.

3 Claims, 2 Drawing Sheets

CONSTANT VELOCITY UNIVERSAL JOINT

TECHNICAL FIELD

This invention relates to a stroking cross groove constant velocity universal joint.

BACKGROUND OF THE INVENTION

A stroking cross groove constant velocity universal joint ("cross groove universal joint") typically includes an outer joint member having a plurality of inward facing outer ball grooves alternately tilted in opposite directions relative to an axis of rotation of the outer joint member and an inner joint member inside of the outerjoint member having a plurality of outward facing inner ball grooves alternately tilted in opposite directions relative to an axis of rotation of the inner joint member. The inner and outer ball grooves face each other in crossed pairs with a bearing ball between each crossed pair for torque transfer between the inner and outer joint members. A cage between the inner and outer joint members has a plurality of windows for the bearing balls which closely confine the bearing balls to a plane bisecting the angle of articulation between the axes of rotation of the inner and outer joint members. In a "disc style" cross groove universal joint where the outer joint member is open at both front and back sides thereof, there is a potential for the bearing balls to escape if the inner joint member is accidentally stroked too far inward or outward from a center position during shipping and handling or during installation in an operating environment such as a motor vehicle front wheel drive system. The potential for such escape of the bearing balls may be reduced by increasing the depth of the outer joint member, by fitting retainers on the front and back sides of the outer joint member, or by staking the outer joint member to define stops at the ends of the outer ball grooves. Increasing the depth of the outer joint member or fitting a retainer on the back side thereof are unattractive solutions because adequate running clearance may require changes in the dimensions of structures near the cross groove universal joint. Staking the outer joint member is unattractive because it requires an additional manufacturing operation after the bearing balls and the cage are assembled between the inner and the outer joint members.

SUMMARY OF THE INVENTION

This invention is a new and improved disc style cross groove universal joint including an outer joint member open on a front side and on a back side having a plurality of inward facing outer ball grooves and an inner joint member inside of the outer joint member having a plurality of outward facing inner ball. The inner and outer ball grooves face each other in crossed pairs with a bearing ball between each crossed pair. In a center position of the inner joint member in the outer joint member, the bearing balls are evenly angularly spaced around the axis of rotation of the outer joint member. A cage between the inner and outer joint members has a plurality of windows for the bearing balls. An outboard side edge of each window is separated from the center of the bearing ball therein by a long span dimension in the center position of the inner joint member. An inboard side edge of each window is separated from the center of the bearing ball therein by a short span dimension in the center position of the inner joint member. The short span dimension is calculated to stop the bearing balls and immobilize the inner joint member during an inward stroke of the latter before the bearing balls can escape through the back side of the outer joint member. A retainer on the front side of the outer joint member stops the bearing balls from escaping during an outward stroke of the inner joint member and provides a mounting structure for a boot seal.

DESCRIPTION OF THE PREFERRED EMBODIMENT

Figure 1:
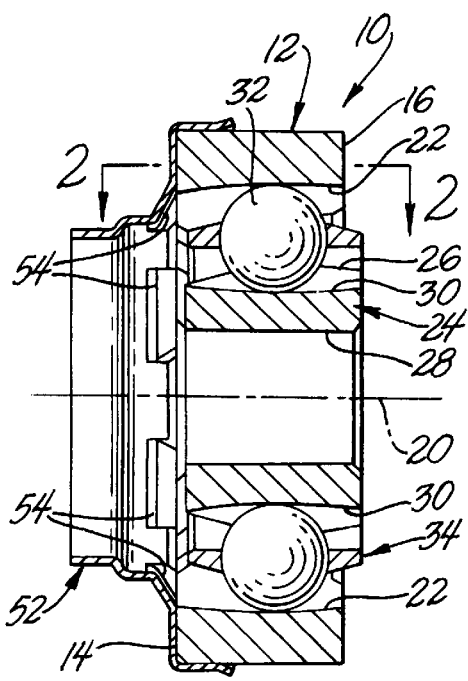
FIG. 1 is a longitudinal sectional view of a disc style cross groove universal joint according to this invention.
Figure 5:
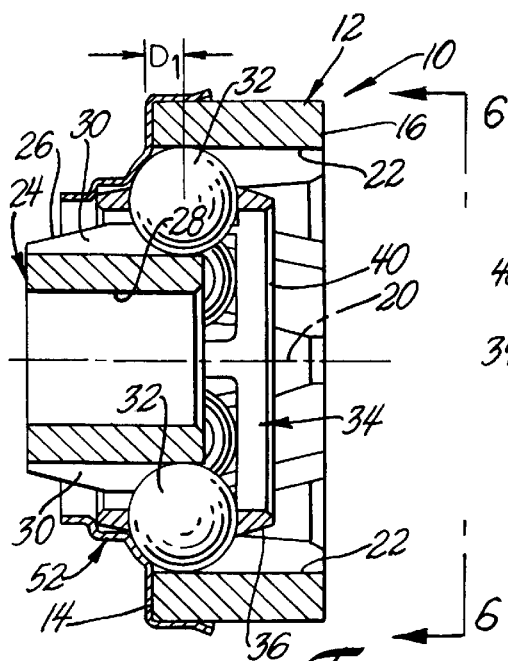
FIG. 5 is similar to FIG. 1 showing an inner joint member of the disc style cross groove universal joint according to this invention in an outer limit position.
Figure 7:
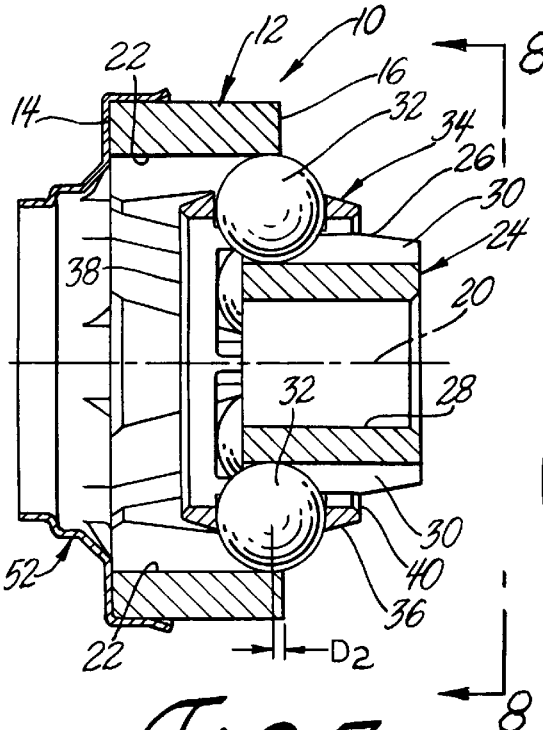
FIG. 7 is similar to FIG. 1 showing the inner joint member of the disc style cross groove universal joint according to this invention in an inner limit position.

A disc style cross groove universal joint 10 according to this invention includes an annular outer joint member 12 having a planar front side 14, a planar back side 16, and a cylindrical inner wall 18. The outer joint member is connected to a supporting structure, not shown, for rotation about an axis of rotation 20, FIGS. 1, 5 and 7, of the outer joint member perpendicular to the planes of the front and back sides 14,16. The inner wall 18 is interrupted by a plurality of outer ball grooves 22 inclined alternately in opposite directions relative to the axis of rotation 20 of the outer joint member. The outer ball grooves have semi-circular, gothic arch, or any other conventional lateral cross section and open through each of the front and back sides 14,16 of the outer joint member.

The disc style cross groove universal joint 10 further includes an inner joint member 24 inside of the outer joint member having an outer wall 26 and a center bore 28 through the middle of the inner joint member. The center bore 28 receives a shaft, not shown, rotatable as a unit with the inner joint member about an axis of rotation thereof which coincides with the axis of rotation 20 of the outer joint member except when the inner joint member is articulated relative to the outer joint member.

Figure 2:
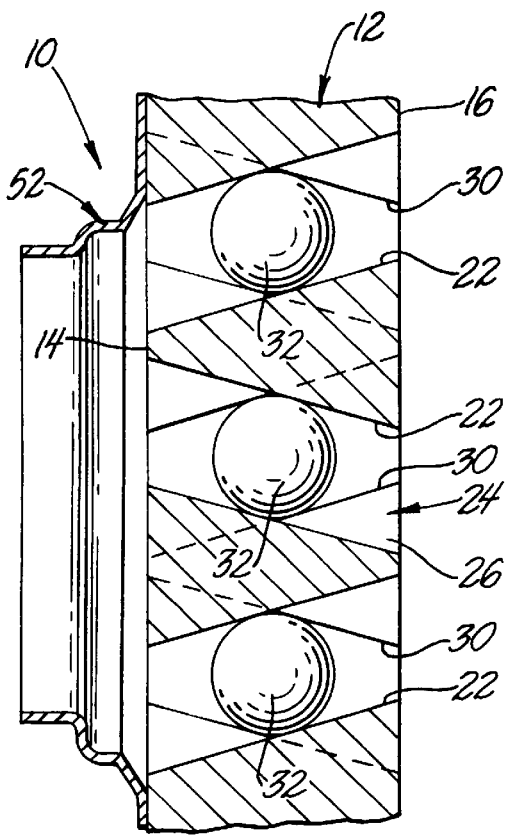
FIG. 2 is a sectional view taken generally along the plane indicated by lines 2—2 in FIG. 1.
Figure 3:
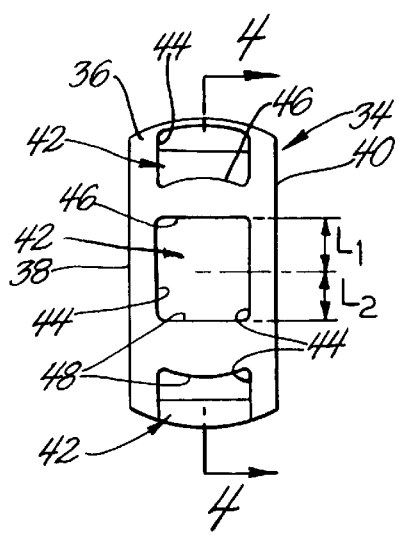
FIG. 3 is a side elevational view of a cage of the disc style cross groove universal joint according to this invention.

The outer wall 26 of the inner joint member is interrupted by a plurality of inner ball grooves 30 facing the outer ball grooves 22 and inclined alternately in opposite directions relative to the axis of rotation of the inner joint member. The inner ball grooves have semi-circular, gothic arch, or any other conventional lateral cross section. The inner and outer ball grooves 30,22 are arrayed in a plurality of crossed pairs, FIG. 2, each having a bearing ball 32 therebetween for transferring torque between the inner and outer joint members 24,12. In a center position of the inner joint member relative to the outer joint member, FIGS. 1–2, the bearing balls 32 are evenly angular spaced around the axis of rotation 20 of the outer joint member, e.g. at 60° angular intervals when the number of bearing balls is six.

A generally cylindrical cage 34 of the disc style cross groove universal joint 10 has an outer wall 36, a front side 38 and a back side 40. The outer wall 36 may be fully spherical or spherical in the middle of the cage with conical surfaces, not shown, on opposite sides thereof. The outer wall 36 cooperates with the cylindrical inner wall 18 of the outer joint member in supporting the cage on the outer joint member for relative rotation about and for relative linear translation in the direction of the axis of rotation 20 of the outer joint member and for universal articulation. The cage 34 has a plurality of windows 42 therein for respective ones of the bearing balls 32. Each cage window 42 has a pair of end edges 44 in planes parallel to the planes of the front and the back sides 38,40 of the cage which cooperate in closely confining the bearings balls in a common plane bisecting the articulation angle between the axes of rotation of the inner and outer joint members.

Figure 4:
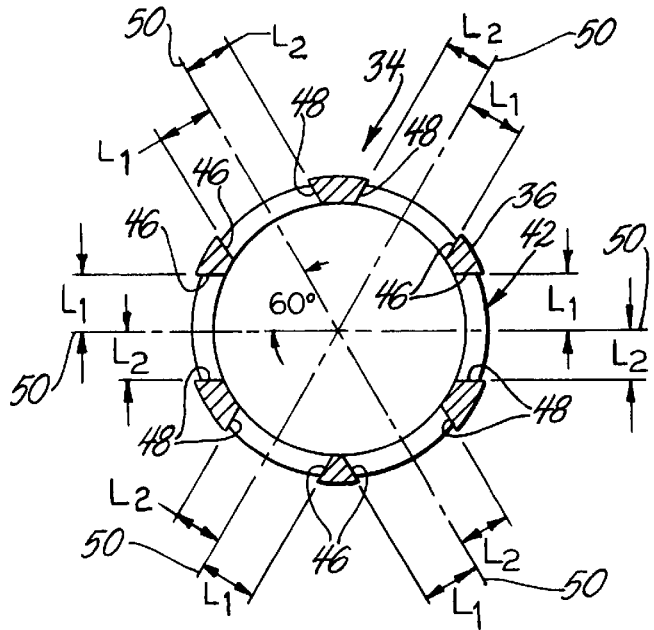
FIG. 4 is a sectional view taken generally along the plane indicated by lines 4—4 in FIG. 3.

When the inner joint member 24 translates or strokes outward toward the front side 14 of the outer joint member, each of the bearing balls 32 rolls between its inner and outer ball grooves 30,22 and shifts laterally in its cage window 42 toward an outboard side edge 46 thereof. Conversely, when the inner joint member 24 translates inward toward the back side 16 of the outer joint member, each of the bearing balls 32 rolls in the opposite direction between its inner and outer ball grooves and shifts laterally in an opposite direction in its cage window 42 toward an inboard side edge 48 thereof. In the center position of the inner joint member 24 in which the bearing balls 32 are evenly spaced around the axis of rotation 20 of the outer joint member, a plurality of evenly angularly spaced radii 50, FIG. 4, represent the geometric centers of the bearing balls. Each of the outboard side edges 46 is separated from the corresponding radius 50 by a long span dimension $L_1$. Each of the inboard side edges 48 is separated from the corresponding radius 50 by a short span dimension $L_2$ shorter than $L_1$.

The bearing balls 32 and the cage 34 are assembled between the inner and outer joint members 24,12 through either the front side 14 or the back side 16 of the outer joint member by articulating the inner joint member through a large articulation angle, not shown, between the axes of rotation of the inner and outer joint members. After the bearing balls are assembled into the cage windows and between the inner and outer ball grooves, the inner joint member is articulated back to where its axis of rotation is coincident with the axis of rotation 20 of the outer joint member. An end of the aforesaid shaft, not shown, e.g. an axle shaft of a motor vehicle front wheel drive, is then rigidly connected to the inner joint member in the center bore 28 thereof. In that circumstance, the inner joint member cannot be articulated to the large angle required for assembly of the bearing balls so that the bearing balls cannot be disassembled the same way unless the shaft is disconnected from the inner joint member.

During shipping and handling of the cross groove universal joint 10 and during its installation in a working environment such as a motor vehicle in a front wheel drive system, there is a potential for the bearing balls 32 to accidentally escape from between the inner and outer ball grooves 30,22 if the inner joint member is stroked too far inward or too far outward. To prevent the bearing balls from escaping in the latter circumstance, the cross groove universal joint 10 includes a sheet metal retainer 52 having a plurality of stops 54 thereon, FIG. 1. The retainer 52 is interference fitted on the outer joint member 12 over the front side 14 thereof where there is little likelihood of interfering with surrounding structures and around the aforesaid shaft connected to the inner joint member. The retainer 52 also defines a mounting structure or adapter for a boot seal, not shown, which protects the cross groove universal joint against internal contamination.

Figure 6:
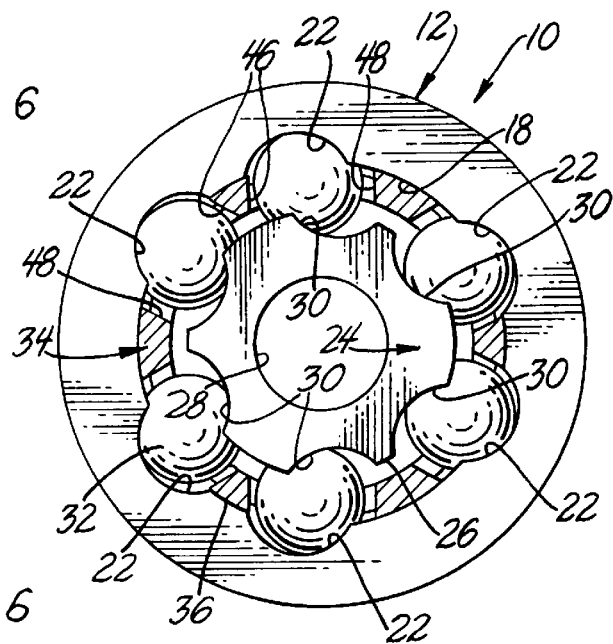
FIG. 6 is a view taken generally along the plane indicated by lines 6—6 in FIG. 5.

The stops 54 are located at the ends of the outer ball grooves 22 where the latter intersect the front side 14 of the outer joint member. The stops intercept the bearing balls before the centers thereof traverse the plane of the front side of the outer joint member. The stops thereby limit outward linear translation of the inner joint member 24 from the center position thereof to an outer limit position, FIGS. 5–6, characterized by a support distance $D_1$ between the centers of the bearing balls 32 and the front side 14 of the outer joint member adequate to prevent the bearing balls from escaping from between the inner and outer ball grooves. The long span dimension $L_1$ of each of the cage windows 42 affords clearance between the outboard side edge 46 of the window and the corresponding bearing ball therein at the outermost position of the inner joint member experienced during operation of the cross groove universal joint.

Figure 8:
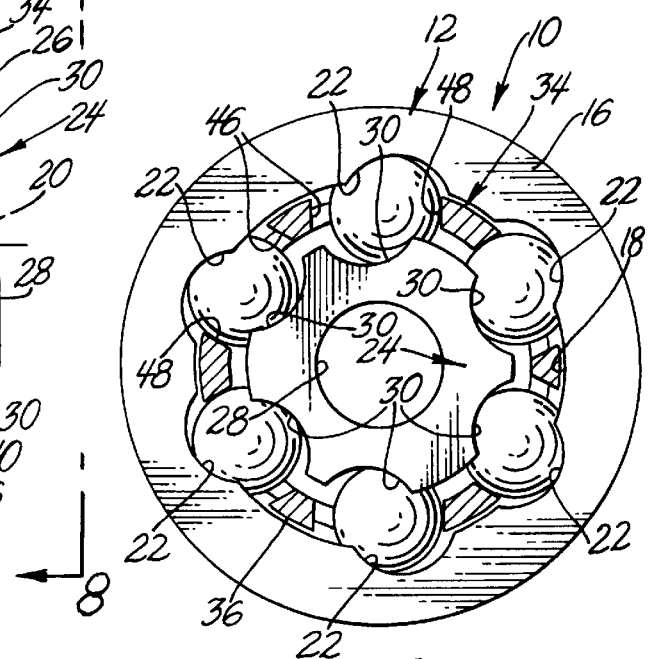
FIG. 8 is a view taken generally along the plane indicated by lines 8—8 in FIG. 7.

During an inward linear stroke of the inner joint member from the center position thereof, the bearing balls 32 roll between the inner and outer ball grooves toward the back side 16 of the outer joint member and shift laterally in the cage windows 42 toward the inboard side edges 48 thereof. The short span dimension $L_2$ of each cage window 42 is calculated to stop the corresponding one of the bearing balls therein, and thereby immobilize the cage 34 and the inner joint member 24, by engagement against the inboard side edge 48 before the centers of the bearing balls traverse the plane of the back side 16 of the outer joint member. The inboard side edges 48 thereby limit inward linear translation of the inner joint member 24 from the center position thereof to an inner limit position, FIGS. 7–8, characterized by a support distance $D_2$ between the centers of the bearing balls 32 and the back side 16 of the outer joint member adequate to prevent the bearing balls from escaping from between the inner and outer ball grooves. The bearing balls 32 are thus prevented from escaping without the use of a retainer on the back side of the outer joint member and without implementation of an additional manufacturing operation such as staking the ends of the outer ball grooves. The inboard limit position of the inner joint member is slightly beyond the innermost position of the inner joint member experienced during operation of the cross groove universal joint 10 to avoid interference between the bearing balls and the inboard side edges of the cage windows.

Having thus described the invention, what is claimed is:

1. A cross groove constant velocity universal joint comprising:

a disc-shaped outer joint member having a front side and a back side and a plurality of inner ball grooves alternately inclined relative to an axis of rotation of said inner joint member and open through each of said front side and said back side, an inner joint member inside of said outer joint member having a plurality of outer ball grooves alternately inclined relative to an axis of rotation of said inner joint member cooperating with said outer ball grooves in defining a plurality of crossed pairs of inner and outer ball grooves, a plurality of bearing balls between respective ones of said plurality of crossed pairs of inner and outer ball grooves for transferring torque between said inner and said outer joint members, each of said bearing balls having a center position evenly angularly separated from the adjacent ones of said bearing balls around said axis of rotation of said outer joint member in a center position of said inner joint member relative to said outer joint member, a tubular cage between said inner and said outer joint members, and a plurality of windows in said tubular cage around respective ones of said plurality of bearing balls each having a pair of end edges closely confining said bearing balls in a common plane and an outboard side edge and an inboard side edge, each of said plurality of bearing balls moving from said center position thereof toward said outboard side edge of the corresponding one of said cage windows in response to outward linear translation of said inner joint member from said center position thereof toward said front side of said outer joint member, each of said bearing balls moving from said center position thereof toward said inboard side edge of the corresponding cage window in response to inward linear translation of said inner joint member from said center position thereof toward said back side of said outer joint member, said inboard side edge of each of said cage windows being separated from said center of said bearing ball therein in said center position of said bearing ball by a short span dimension calculated to effect interference between said bearing ball and said inboard side edge before the center of said bearing ball traverses the plane of said back side of said outer joint member thereby to immobilize said inner joint member before said bearing balls can escape from between said inner and said outer ball grooves, and said outboard side edge of each of said cage windows being separated from the center of said bearing ball therein in said center position of said bearing ball by a long span dimension exceeding said short span dimension.

2. The cross groove constant velocity universal joint recited in claim 1 further comprising:

a stop means operative to intercept each of said bearing balls during outward linear translation of said inner joint member toward said front side of said outer joint member before the centers of said bearing balls traverse the plane of said front side of said outer joint member and before said bearing balls engage said outboard side edges of corresponding ones of said cage windows.

3. The cross groove constant velocity universal joint recited in claim 2 wherein said stop means comprises:

a retainer interference fitted on said outer joint member over said front side thereof having a plurality of stops aligned with respective ones of said outer ball grooves where each of said outer ball grooves intersects the plane of said front side of said outer joint member.

* * * * *